(12) United States Patent
Leenan et al.

(10) Patent No.: US 10,202,514 B2
(45) Date of Patent: Feb. 12, 2019

(54) GRAFFITI REMOVAL COMPOSITIONS AND THE USE THEREOF

(71) Applicant: GUARD IT SOLUTIONS PTY LTD, Victoria (AU)

(72) Inventors: Anthony Leenan, Melbourne (AU); Peter Richardt, Melbourne (AU)

(73) Assignee: GUARD IT SOLUTIONS PTY LTD, Victoria (AU)

( * ) Notice: Subject to any disclaimer, the term of this patent is extended or adjusted under 35 U.S.C. 154(b) by 62 days.

(21) Appl. No.: 15/319,750

(22) PCT Filed: Jun. 18, 2015

(86) PCT No.: PCT/AU2015/050339
§ 371 (c)(1),
(2) Date: Dec. 16, 2016

(87) PCT Pub. No.: WO2015/192184
PCT Pub. Date: Dec. 23, 2015

(65) Prior Publication Data
US 2017/0137639 A1    May 18, 2017

(30) Foreign Application Priority Data

Jun. 20, 2014 (AU) ................................ 2014902360
Oct. 29, 2014 (AU) ................................ 2014904329

(51) Int. Cl.
| | |
|---|---|
| *B08B 3/10* | (2006.01) |
| *C09D 9/04* | (2006.01) |
| *C11D 3/43* | (2006.01) |
| *C11D 3/20* | (2006.01) |
| *B08B 1/00* | (2006.01) |
| *B08B 3/08* | (2006.01) |
| *C11D 1/72* | (2006.01) |
| *C11D 1/74* | (2006.01) |
| *C11D 11/00* | (2006.01) |

(52) U.S. Cl.
CPC ................ *C09D 9/04* (2013.01); *B08B 1/002* (2013.01); *B08B 3/08* (2013.01); *B08B 3/102* (2013.01); *C11D 3/2093* (2013.01); *C11D 3/43* (2013.01); *C11D 1/72* (2013.01); *C11D 1/74* (2013.01); *C11D 11/0052* (2013.01)

(58) Field of Classification Search
CPC .. C09D 9/04; B08B 1/002; B08B 3/08; B08B 3/102
See application file for complete search history.

(56) References Cited

U.S. PATENT DOCUMENTS

| | | | | |
|---|---|---|---|---|
| 4,589,925 A | * | 5/1986 | Young | C23G 1/081 134/22.14 |
| 2008/0081778 A1 | * | 4/2008 | Decker | C09D 9/04 510/505 |
| 2010/0286017 A1 | * | 11/2010 | Righetto | C11D 3/2093 510/283 |
| 2015/0045278 A1 | * | 2/2015 | Beisser | C11D 3/3472 510/206 |

FOREIGN PATENT DOCUMENTS

WO    WO-2013139842 A1 *    9/2013    ........... C11D 3/3472

* cited by examiner

*Primary Examiner* — Sharidan Carrillo
(74) *Attorney, Agent, or Firm* — K&L Gates LLP

(57) ABSTRACT

The present invention relates to graffiti removal compositions and the use thereof for the removal of graffiti from surfaces. The compositions comprise (i) alkyl esters of one or more soybean oil fatty acids; (ii) one or more aliphatic diesters of dicarboxylic acids; (iii) one or more compounds of the formula $R_2C(O)OR_3$, wherein $R_2$ is a $C_1$-$C_{20}$ alkyl and $R_3$ is $C_1$-$C_{20}$ alkyl; and (iv) a surfactant.

5 Claims, No Drawings

GRAFFITI REMOVAL COMPOSITIONS AND THE USE THEREOF

FIELD OF THE INVENTION

The present invention broadly relates to graffiti removal compositions and the use thereof for the removal of graffiti from surfaces.

BACKGROUND OF THE INVENTION

Graffiti is an unsightly ongoing problem that exists in many urban areas. From an aesthetic point of view it is desirable to remove graffiti as soon as possible after it has been applied. Many known compositions for removing graffiti frequently comprise toxic, non-biodegradable compounds. For example, methylene chloride, which is both volatile and highly toxic, is a common ingredient in known graffiti removal compositions. Other known compositions used for graffiti removal include caustic solutions making them highly corrosive and hazardous to handle.

Against this background, the present inventors have developed graffiti removal compositions which are highly effective, yet readily biodegradable and non-toxic.

SUMMARY OF THE INVENTION

In a first aspect the present invention provides a composition comprising:
(i) alkyl esters of one or more soybean oil fatty acids;
(ii) one or more aliphatic diesters of dicarboxylic acids;
(iii) one or more compounds of the formula $R_2C(O)OR_3$, wherein $R_2$ is $C_1$-$C_{20}$ alkyl and $R_3$ is $C_1$-$C_{10}$ alkyl; and
(iv) a surfactant.

The alkyl esters of the one or more soybean oil fatty acids may be $C_1$-$C_{20}$ alkyl esters or mixtures thereof, $C_1$-$C_{10}$ alkyl esters or mixtures thereof, $C_1$-$C_4$ alkyl esters or mixtures thereof, or methyl esters.

In one embodiment $R_2$ is $C_3$-$C_{15}$ alkyl.
In one embodiment $R_2$ is $C_3$-$C_{12}$ alkyl.
In another embodiment $R_2$ is $C_6$-$C_{12}$ alkyl.
In another embodiment $R_2$ is $C_7$-$C_9$ alkyl.
In another embodiment $R_3$ is $C_1$-$C_6$ alkyl.
In a further embodiment $R_3$ is methyl or ethyl.
In still a further embodiment $R_3$ is methyl.

The aliphatic diesters of dicarboxylic acids may have the following formula (I):

$$ROC(O)\text{-}T\text{-}C(O)OR^1 \qquad (I)$$

wherein R and $R^1$ are independently $C_1$-$C_{20}$ alkyl and T is a straight-chain or branched-chain alkanediyl group having between 1 and 15 carbon atoms, or is absent.

In one embodiment R and $R^1$ are independently $C_1$-$C_{10}$ alkyl and T is a straight-chain or branched-chain alkanediyl group having between 1 and 10 carbon atoms.

In an alternative embodiment R and $R^1$ are independently $C_1$-$C_4$ alkyl and T is a straight-chain or branched-chain alkanediyl group having between 1 and 6 carbon atoms.

In another embodiment R and $R^1$ are methyl and T is a straight-chain or branched-chain alkanediyl group having between 1 and 5 carbon atoms.

The surfactant may be an ionic, non-ionic, cationic, anionic or amphoteric surfactant. In one embodiment, the surfactant is a non-ionic surfactant, for example an ethoxylated alcohol.

The composition may further comprise an alkyl lactate, for example a $C_1$-$C_6$ alkyl lactate.

The composition may further comprise a $C_1$-$C_{10}$ alcohol.
The composition may further comprise silica.
The composition may further comprise a thickening agent in an amount effective to modify the viscosity of the composition such that the composition will not flow when applied to a surface.

The thickening agent may be cellulose or a derivative thereof, such as a cellulose ether.

In one embodiment the composition has a viscosity between about 0.5 cPs and about 3000 cPs.

The one or more compounds of the formula $R_2C(O)OR_3$ may be present in the composition in an amount between about 0.5% and about 20% by weight.

The alkyl esters of the one or more soybean oil fatty acids may be present in the composition in an amount between about 1% and about 45% by weight.

The one or more aliphatic diesters of dicarboxylic acids may be present in the composition in an amount between about 30% and about 85% by weight.

The surfactant may be present in the composition in an amount between about 1% and about 25% by weight.

The thickening agent may be present in the composition in an amount between about 0.05% and about 10% by weight.

The alkyl lactate may be present in the composition in an amount between about 1% and about 45% by weight.

The $C_1$-$C_{10}$ alcohol may be present in the composition in an amount between about 1% and about 10% by weight.

The composition may have a pH between about 5.0 and about 8.0, or a pH between about 6.0 and about 7.0, or a pH between about 6.0 and about 6.5, or a pH of about 6.2.

In some embodiments the composition is in the form of a gel.

In a second aspect the present invention provides a method for removing graffiti from a surface comprising: applying the composition of the first aspect to the graffiti, and rinsing the surface to remove the composition and the graffiti.

The method may further comprise agitating the surface to which the composition has been applied.

In a third aspect the present invention provides a method for removing graffiti from a graffitied surface comprising:
(i) applying the composition of the first aspect to the graffitied surface;
(ii) applying urea, or a salt thereof, to the graffitied surface;
(iii) rinsing the graffitied surface to remove the composition of the first aspect, the urea or a salt thereof and the graffiti;

The method may further comprise agitating the surface to which the composition of the first aspect, and/or the urea, or a salt thereof, has been applied.

The urea, or salt thereof, may be applied in water, for example as a solution.

Definitions

The following are some definitions that may be helpful in understanding the description of the present invention. These are intended as general definitions and should in no way limit the scope of the present invention to those terms alone, but are put forth for a better understanding of the following description.

Throughout this specification, unless the context requires otherwise, the word "comprise", or variations such as "comprises" or "comprising", will be understood to imply the inclusion of a stated element, integer or step, or group of elements, integers or steps, but not the exclusion of any other element, integer or step, or group of elements, integers or steps. Thus, in the context of this specification, the term "comprising" means "including principally, but not necessarily solely".

In the context of this specification the term "consisting essentially of" is intended to exclude components that would materially affect the properties of the composition or formulation to which it refers.

In the context of this specification the term "about" is understood to refer to a range of numbers that a person of skill in the art would consider equivalent to the recited value in the context of achieving the same function or result.

In the context of this specification the terms "a" and "an" are used herein to refer to one or to more than one (i.e to at least one) of the grammatical object of the article. By way of example, "an element" means one element or more than one element.

In the context of this specification the term "alkanediyl" is understood to refer to a bivalent saturated branched or straight chain hydrocarbon group conforming to the formula $C_nH_{2n}$.

In the context of this specification the terms "$C_1$-$C_6$ alcohol" and "$C_1$-$C_{10}$ alcohol" are taken to mean straight chain or branched chain saturated hydrocarbons having between 1 and 6 or between 1 and 10 carbon atoms and a single hydroxy group. Examples of $C_1$-$C_6$ and $C_1$-$C_{10}$ alcohols include, but are not limited to, methanol, ethanol, 1-propanol, 2-propanol, isopropanol, 1-butanol, 2-butanol, isobutanol, tert-butanol, isopentanol, 1-pentanol, 2-pentanol, 2-methyl-1-pentanol, 4-methyl-1-pentanol, 3-methyl-2-pentanol, 1-hexanol, 2-hexanol, 3-hexanol, 1-heptanol, 3,4-dimethyl-1-heptanol, 2-octanol, 1-decanol, and the like.

In the context of this specification, the term "alkyl" is taken to mean straight chain or branched chain monovalent saturated hydrocarbon groups having the recited number of carbon atoms. Examples of alkyl groups include, but are not limited to, methyl, ethyl, 1-propyl, isopropyl, 1-butyl, 2-butyl, isobutyl, tert-butyl, amyl, 1,2-dimethylpropyl, 1,1-dimethylpropyl, pentyl, isopentyl, hexyl, 4-methylpentyl, 1-methylpentyl, 2-methylpentyl, 3-methylpentyl, 2,2-dimethylbutyl, 3,3-dimethylbutyl, 1,2-dimethylbutyl, 1,3-dimethylbutyl, 1,2,2-trimethylpropyl, 1,1,2-trimethylpropyl, 2-ethylpentyl, 3-ethylpentyl, heptyl, 1-methylhexyl, 2,2-dimethylpentyl, 3,3-dimethylpentyl, 4,4-dimethylpentyl, 1,2-dimethylpentyl, 1,3-dimethylpentyl, 1,4-dimethylpentyl, 1,2,3-trimethylbutyl, 1,1,2-trimethylbutyl, 1,1,3-trimethylbutyl, 5-methylheptyl, 1-methylheptyl, octyl, nonyl, dodecyl and the like.

In the context of the present specification, the term "substantially free" is understood to mean less than about 0.01%, or less than about 0.005%, or less than about 0.001%, or less than about 0.0001% of the recited component by weight in the composition.

In the context of the present specification, the term "readily biodegradable" means that 60% to 70% of the composition to which it refers is able to be degraded or broken down in a natural environment within 28 days.

DETAILED DESCRIPTION OF THE INVENTION

In one aspect the present invention provides a graffiti removal composition comprising, consisting of, or consisting essentially of:
(i) alkyl esters of one or more soybean oil fatty acids;
(ii) one or more aliphatic diesters of dicarboxylic acids;
(iii) one or more compounds of the formula $R_2C(O)OR_3$, wherein $R_2$ is $C_1$-$C_{20}$ alkyl and $R_3$ is $C_1$-$C_{10}$ alkyl; and
(iv) a surfactant.

The compositions find use in the removal of graffiti applied with, for example, paint, permanent markers and inks from various surfaces with little or no adverse effects on the surfaces. The surfaces may be porous or non-porous. Non-limiting examples of surfaces include: aluminium, brick, glass, rendered surfaces, plastics, perspex, reflective signs, timber, metal, colorbond, concrete, sandstone and other masonry surfaces.

The compositions are non-toxic, non-flammable, non-irritant, non-carcinogenic, readily biodegradable and free, or substantially free, of caustic compounds and chlorinated solvents, such as dichloromethane. The composition may also be free, or substantially free, of N-methylpyrrolidone. The composition may also be free, or substantially free, of aromatic solvents, such as benzene, toluene, xylene and the like.

The composition comprises alkyl esters of one or more soybean oil fatty acids. Typically, the composition comprises alkyl esters of a plurality of soybean oil fatty acids. The major fatty acids present in soybean oil (as triglycerides) are linolenic acid, linoleic acid, oleic acid, stearic acid and palmitic acid. Accordingly, in one embodiment, the composition comprises alkyl esters of linolenic acid, linoleic acid, stearic acid, oleic acid and palmitic acid. The amounts of these esters as a weight percentage of the total amount of soybean oil fatty acid esters in the composition may be as follows:

| Ester type | Amount |
| --- | --- |
| Linolenic | 5-15% |
| Linoleic | 40-60% |
| Oleic | 20-40% |
| Stearic | 1-8% |
| Palmitic | 5-15% |

The alkyl esters of one or more soybean oil fatty acids may be $C_1$-$C_{20}$ alkyl esters or mixtures thereof, $C_1$-$C_{10}$ alkyl esters or mixtures thereof, $C_1$-$C_6$ alkyl esters or mixtures thereof, $C_1$-$C_4$ alkyl esters or mixtures thereof, or methyl esters.

Soybean oil methyl esters (methyl soyate) are commercially available from Stepan Company, Vertec BioSolvents and Cargill Inc. Those skilled in the art will readily be able to prepare alkyl esters of soybean oil fatty acids by transesterification of soybean oil with an appropriate alcohol, for example methanol.

The alkyl esters of one or more soybean oil fatty acids may be present in the composition in an amount between about 1% and about 45% by weight, or in an amount between about 2% and about 40% by weight, or in an amount between about 2% and about 35% by weight, or in an amount between about 2% and about 30% by weight, or in an amount between about 2% and about 25% by weight.

The composition further comprises one or more aliphatic diesters of dicarboxylic acids. The aliphatic diesters of dicarboxylic acids may have the following formula (I):

$$ROC(O)\text{-}T\text{-}C(O)OR^1 \qquad (I)$$

wherein R and $R^1$ are independently $C_1$-$C_{20}$ alkyl and T is a straight-chain or branched-chain alkanediyl group having between 1 and 15 carbon atoms, or is absent.

In one embodiment R and $R^1$ are independently $C_1$-$C_{10}$ alkyl and T is a straight-chain or branched-chain alkanediyl group having between 1 and 10 carbon atoms. In an alternative embodiment R and $R^1$ are independently $C_1$-$C_4$ alkyl and T is a straight-chain or branched-chain alkanediyl group having between 1 and 6 carbon atoms. In another embodiment R and $R^1$ are methyl and T is a straight-chain or branched-chain alkanediyl group having between 1 and 6 carbon atoms. In another embodiment R and $R^1$ are methyl and T is a straight-chain or branched-chain alkanediyl group having between 1 and 5 carbon atoms. In still a further embodiment R and $R^1$ are isobutyl and T is a straight-chain or branched-chain alkanediyl group having between 1 and 5 carbon atoms.

Preferably, the alkanediyl groups are unsubstituted.

Typically, the composition comprises a plurality of aliphatic diesters of dicarboxylic acids, for example 2, 3, 4, 5, 6, 7, 8, or more aliphatic diesters of dicarboxylic acids. In some embodiments the composition comprises at least 2, at least 3, at least 4, or at least 5 aliphatic diesters of dicarboxylic acids. In other embodiments the composition comprises between 2 and 8, between 2 and 6, or between 2 and 4 aliphatic diesters of dicarboxylic acids.

Useful aliphatic diesters of dicarboxylic acids include but are not limited to diesters of oxalic acid, malonic acid, succinic acid, glutaric acid, adipic acid, pimelic acid, suberic acid, azelaic acid and sebacic acid, such as dimethyl-2-methylglutarate, dimethyl adipate, dimethyl glutarate, dimethyl succinate, diisobutyl succinate, diisobutyl adipate, and diisobutyl glutarate. Mixtures of these aliphatic diesters of dicarboxylic acids may be used. Aliphatic diesters of dicarboxylic acids are commercially available under the trade names Rhodiasolv® and FlexiSolv®.

In some embodiments the composition comprises a mixture of dimethyl adipate, dimethyl glutarate and dimethyl succinate. The amount of each compound in the composition as a weight percentage of the total amount of aliphatic diesters of dicarboxylic acids in the composition may be as follows:

| Compound | Amount |
| --- | --- |
| Dimethyl adipate | 9-17% |
| Dimethyl glutarate | 59-67% |
| Dimethyl succinate | 20-28% |

In other embodiments the composition comprises a mixture of diisobutyl adipate, diisobutyl glutarate and diisobutyl succinate. In other embodiments the composition comprises one or more of: dimethyl-2-methylglutarate, dimethyl adipate, dimethyl glutarate, dimethyl succinate, diisobutyl succinate, diisobutyl adipate and diisobutyl glutarate.

The one or more aliphatic diesters of dicarboxylic acids may be present in the composition in an amount between about 30% and about 90% by weight, or in an amount between about 30% and about 80% by weight, or in an amount between about 40% and about 80% by weight, or in an amount between about 50% and about 80% by weight.

The composition further comprises one or more ester compounds of the formula $R_2C(O)OR_3$, wherein $R_2$ is $C_1$-$C_{20}$ alkyl and $R_3$ is $C_1$-$C_{10}$ alkyl. In one embodiment $R_2$ is $C_3$-$C_{15}$ alkyl. In another embodiment $R_2$ is $C_3$-$C_{12}$ alkyl. In another embodiment $R_2$ is $C_5$-$C_{12}$ alkyl. In another embodiment $R_2$ is $C_7$-$C_{12}$ alkyl. In another embodiment $R_2$ is $C_7$-$C_9$ alkyl. In a further embodiment $R_3$ is methyl or ethyl. In still a further embodiment $R_3$ is methyl. In another embodiment $R_3$ is $C_1$-$C_6$ alkyl. In other embodiments $R_2$ is $C_7$-$C_9$ alkyl and $R_3$ is methyl. Typically, the composition comprises a plurality of compounds of the formula $R_2C(O)OR_3$, for example 2, 3, 4, 5, 6, 7, 8, or more compounds of the formula $R_2C(O)OR_3$. In some embodiments the composition comprises at least 2, at least 3, at least 4, or at least 5 compounds of the formula $R_2C(O)OR_3$. In other embodiments the composition comprises between 2 and 8, between 2 and 6, or between 2 and 4 compounds of the formula $R_2C(O)OR_3$. Useful compounds of the formula $R_2C(O)OR_3$ include, but are not limited to: methyl acetate, ethyl acetate, propyl acetate, methyl propionate, methyl butanoate, ethyl butanoate, methyl pentanoate, ethyl pentanoate, propyl pentanoate, methyl hexanoate, propyl hexanoate, methyl heptanoate, ethyl heptanoate, butyl heptanoate, methyl octanoate, ethyl octanoate, methyl nonanoate, ethyl nonanoate, propyl nonanoate, methyl decanoate, ethyl decanoate, propyl undecanoate and methyl dodecanoate.

Mixtures of compounds of the formula $R_2C(O)OR_3$ may be used. In one embodiment the composition comprises a mixture of methyl octanoate and methyl decanoate. The mixture of methyl octanoate and methyl decanoate may be a 2:1 mixture. Compounds of the formula $R_2C(O)OR_3$ are commercially available under the trade name Dispersa O-250.

The one or more compounds of the formula $R_2C(O)OR_3$ may be present in the composition in an amount between about 0.5% and about 20% by weight, or in an amount between about 0.5% and about 10% by weight, or in an amount between about 0.5% and about 5% by weight, or in an amount between about 0.5% and about 3% by weight, or in an amount between about 0.5% and about 2% by weight.

Surfactants suitable for use in the compositions include anionic, cationic, amphoteric and non-ionic surfactants. Surfactants are well known to those skilled in the art. Non-limiting examples of anionic surfactants include sulfate esters, sulfonate esters, phosphate esters and alkyl carboxylates. Non-limiting examples of cationic surfactants include quaternary ammonium compounds, such as cetyl trimethylammonium bromide, cetylpyridinium chloride, benzethonium chloride and dioctadecyldimethylammonium bromide. Non-limiting examples of amphoteric surfactants include betaines, imino acetates and imino propionates. Non-limiting examples of non-ionic surfactants include fatty alcohols, glucosides, sorbitan alkyl esters, block copolymers of polyethylene glycol and polypropylene glycol, ethoxylated amines and ethoxylated alcohols. In one embodiment, the surfactant is an ethoxylated alcohol such as, for example, a fatty alcohol ethoxylate such as a $C_{12}$-$C_{14}$ ethoxylated alcohol. $C_{12}$-$C_{14}$ ethoxylated alcohol surfactants are available from Orica under the trade name ORISURF LA8. Other suitable ethoxylated alcohol surfactants will be well known to those skilled in the art.

The surfactant may be present in the composition in an amount between about 1% and about 25% by weight, or in an amount between about 5% and about 20% by weight, or in an amount between about 5% and about 15% by weight.

The composition may further comprise an alkyl lactate. In some embodiments the alkyl lactate is a $C_1$-$C_6$ alkyl lactate or a mixture thereof, for example a methyl, ethyl, propyl or butyl lactate.

The alkyl lactate may be present in the composition in an amount between about 1% and about 45% by weight, or in an amount between about 2% and about 40% by weight, or in an amount between about 2% and about 35% by weight, or in an amount between about 2% and about 30% by weight, or in an amount between about 2% and about 25% by weight.

In some embodiments the composition further comprises a $C_1$-$C_{10}$ alcohol or a $C_1$-$C_6$ alcohol or a mixture thereof. Non-limiting examples of such alcohols include methanol, ethanol, propanol, isopropanol, butanol and the like. The $C_1$-$C_{10}$ alcohol may be present in the composition in an amount between about 1% and about 10% by weight, or in an amount between about 1% and about 5% by weight.

The composition may further comprise silica. The presence of silica may provide mechanical assistance in the removal of graffiti from a surface, particularly a porous surface. The silica may be present in an amount between about 0.5% and about 5% by weight, or in an amount between about 0.5% and about 3% by weight, or in an amount between about 1% and about 2% by weight.

In some embodiments the composition further comprises a thickening agent in an amount effective to modify the viscosity of the composition such that the composition will not flow when applied to a surface. Thickening agents are well known to those skilled in the art. Thickening agents that may be used in the compositions of the invention include, but are not limited to algae extracts, gums, starches, pectins, hydrolysed proteins, cellulose and derivatives thereof, polymers, copolymers, parrafin and clays. Algae extracts that may be used include, but are not limited to alginates and carrageenans. Hydrolysed proteins include, but are not limited to gelatin. Cellulose derivatives that may be used include cellulose ethers such as, for example, methylcellulose, ethylcellulose, hydroxypropylmethylcellulose and hydroxyethylcellulose. Cellulose ethers are commercially available from Dow Chemical under the trade name METHOCEL®.

The amount of thickening agent present in the composition will depend on the particular thickening agent being used. Typically, the thickening agent is present in the composition in an amount between about 0.05% and about 10% by weight, or in an amount between about 0.05% and about 5% by weight, or in an amount between about 0.05% and about 2% by weight, or in an amount between about 0.05% and about 1.5% by weight.

In some embodiments, the composition has a viscosity between about 0.5 cPs and about 3000 cPs.

In one embodiment the composition comprises: a compound of the formula $C_7$-$C_9$alkylC(O)OC$_1$-C$_2$alkyl, methyl esters of soybean oil fatty acids, dimethyl adipate, dimethyl glutarate, dimethyl succinate, an ethoxylated alcohol surfactant and a $C_1$-$C_6$ alkyl lactate.

In another embodiment the composition comprises: a compound of the formula $C_7$-$C_9$alkylC(O)OC$_1$-C$_2$alkyl, methyl esters of soybean oil fatty acids, dimethyl adipate, dimethyl glutarate, dimethyl succinate, an ethoxylated alcohol surfactant and a $C_1$-$C_3$ alkyl lactate.

In a further embodiment the composition comprises: a compound of the formula $C_7$-$C_9$alkylC(O)OC$_1$-C$_2$alkyl, methyl esters of soybean oil fatty acids, diisobutyl adipate, diisobutyl glutarate, diisobutyl succinate, an ethoxylated alcohol surfactant and a $C_1$-$C_6$ alkyl lactate.

In still a further embodiment the composition comprises: a compound of the formula $C_7$-$C_9$alkylC(O)OC$_1$-C$_2$alkyl, methyl esters of soybean oil fatty acids, diisobutyl adipate, diisobutyl glutarate, diisobutyl succinate, an ethoxylated alcohol surfactant and a $C_1$-$C_3$ alkyl lactate.

In yet another embodiment the composition comprises: a compound of the formula $C_7$-$C_9$alkylC(O)OC$_1$-C$_2$alkyl, methyl esters of soybean oil fatty acids, dimethyl-2-methylglutarate, an ethoxylated alcohol surfactant and a $C_1$-$C_6$ alkyl lactate.

In still a further embodiment the composition comprises: a compound of the formula $C_7$-$C_9$alkylC(O)OC$_1$-C$_2$alkyl, methyl esters of soybean oil fatty acids, dimethyl-2-methylglutarate, an ethoxylated alcohol surfactant and a $C_1$-$C_3$ alkyl lactate.

In another embodiment the composition comprises, consists of, or consists essentially of:
(i) $C_1$-$C_6$ alkyl esters of soybean oil fatty acids;
(ii) one or more aliphatic diesters of dicarboxylic acids of the formula (I):

$$ROC(O)\text{-}T\text{-}C(O)OR^1 \qquad (I)$$

wherein R and $R^1$ are independently $C_1$-$C_4$ alkyl and T is a straight-chain or branched-chain alkanediyl group having between 1 and 6 carbon atoms;
(iii) a non-ionic surfactant, such as for example an ethoxylated alcohol surfactant;
(iv) one or more compounds of the formula $C_3$-$C_{15}$alkylC(O)OC$_1$-C$_2$alkyl; and
(v) a $C_1$-$C_6$ alkyl lactate.

In another embodiment the composition comprises, consists of, or consists essentially of:
(i) $C_1$-$C_6$ alkyl esters of soybean oil fatty acids;
(ii) one or more aliphatic diesters of dicarboxylic acids of the formula (I):

$$ROC(O)\text{-}T\text{-}C(O)OR^1 \qquad (I)$$

wherein R and $R^1$ are independently $C_1$-$C_4$ alkyl and T is a straight-chain or branched-chain alkanediyl group having between 1 and 6 carbon atoms;
(iii) a non-ionic surfactant, such as for example an ethoxylated alcohol surfactant;
(iv) one or more compounds of the formula $C_5$-$C_{11}$alkylC(O)OMe; and
(v) a $C_1$-$C_6$ alkyl lactate.

In another embodiment the composition comprises, consists of, or consists essentially of:
(i) $C_1$-$C_6$ alkyl esters of soybean oil fatty acids;
(ii) one or more aliphatic diesters of dicarboxylic acids of the formula (I):

$$ROC(O)\text{-}T\text{-}C(O)OR^1 \qquad (I)$$

wherein R and $R^1$ are independently $C_1$-$C_4$ alkyl and T is a straight-chain or branched-chain alkanediyl group having between 1 and 6 carbon atoms;
(iii) a non-ionic surfactant, such as for example an ethoxylated alcohol surfactant;
(iv) one or more compounds of the formula $C_7$-$C_9$alkylC(O)OMe; and
(v) a $C_1$-$C_6$ alkyl lactate.

In yet another embodiment the composition comprises, consists of, or consists essentially of:
(i) methyl esters of soybean oil fatty acids;
(ii) one or more aliphatic diesters of dicarboxylic acids of the formula (I):

$$ROC(O)\text{-}T\text{-}C(O)OR^1 \qquad (I)$$

wherein R and $R^1$ are independently $C_1$-$C_4$ alkyl and T is a straight-chain or branched-chain alkanediyl group having between 1 and 6 carbon atoms;
(iii) a non-ionic surfactant, such as for example an ethoxylated alcohol surfactant;
(iv) one or more compounds of the formula $C_7$-$C_9$alkylC(O)OMe; and
(v) a $C_1$-$C_6$ alkyl lactate.

In the above embodiments the esters of soybean oil fatty acids may be present in the composition in an amount between about 1% and about 45% by weight, or in an amount between about 2% and about 35% by weight. The one or more aliphatic diesters of dicarboxylic acids of the formula (I) may be present in the composition in an amount between about 30% and about 85% by weight, or in an amount between about 50% and about 80% by weight. The surfactant may be present in the composition in an amount between about 5% and about 20% by weight, or in an amount between about 5% and about 15% by weight. The $C_1$-$C_6$ alkyl lactate may be present in the composition in an amount between about 1% and about 45% by weight, or in an amount between about 2% and about 35% by weight. The one or more compounds of the formula $C_3$-$C_{15}$alkylC(O)OC$_1$-$C_2$alkyl, $C_5$-$C_{11}$alkylC(O)OMe or $C_7$-$C_9$alkylC(O)OMe may be present in the composition in an amount between about 0.5% and about 10% by weight, or in an amount between about 0.5% and about 3% by weight, or in an amount between about 0.5% and about 2% by weight.

In still a further embodiment the composition comprises, consists of, or consists essentially of:
(i) methyl esters of soybean oil fatty acids;
(ii) one or more aliphatic diesters of dicarboxylic acids of the formula (I):

$$ROC(O)\text{-}T\text{-}C(O)OR^1 \qquad (I)$$

wherein R and $R^1$ are independently $C_1$-$C_4$ alkyl and T is a straight-chain or branched-chain alkanediyl group having between 1 and 6 carbon atoms;
(iii) an ethoxylated alcohol surfactant;
(iv) one or more compounds of the formula $C_7$-$C_9$alkylC(O)OMe; and
(v) a $C_1$-$C_6$ alkyl lactate.

In the above embodiment the methyl esters of soybean oil fatty acids may be present in the composition in an amount between about 1% and about 45% by weight, or in an amount between about 2% and about 35% by weight. The one or more aliphatic diesters of dicarboxylic acids of the formula (I) may be present in the composition in an amount between about 30% and about 85% by weight, or in an amount between about 50% and about 80% by weight. The ethoxylated alcohol surfactant may be present in the composition in an amount between about 5% and about 20% by weight, or in an amount between about 5% and about 15% by weight. The $C_1$-$C_6$ alkyl lactate may be present in the composition in an amount between about 1% and about 45% by weight, or in an amount between about 2% and about 35% by weight. The one or more compounds of the formula $C_7$-$C_9$alkylC(O)OMe may be present in the composition in an amount between about 0.5% and about 10% by weight, or in an amount between about 0.5% and about 3% by weight. In the above embodiment the composition may further comprise one or more of: a $C_1$-$C_6$ alcohol, a cellulose ether and silica. The silica may be present in the composition in an amount between about 1% and about 2% by weight. The cellulose ether may be present in the composition in an amount between about 0.05% and about 2% by weight. The $C_1$-$C_6$ alcohol may be present in the composition in an amount between about 1% and about 5% by weight. In the above embodiment the composition may comprise one or more of: dimethyl-2-methylglutarate, dimethyl adipate, dimethyl glutarate, dimethyl succinate, diisobutyl succinate, diisobutyl adipate and diisobutyl glutarate.

In another embodiment the composition comprises, consists of, or consists essentially of:
(i) methyl esters of soybean oil fatty adds:
(ii) one or more aliphatic diesters of dicarboxylic acids of the formula (I):

$$ROC(O)\text{-}T\text{-}C(O)OR^1 \qquad (I)$$

wherein R and $R^1$ are independently $C_1$-$C_4$ alkyl and T is a straight-chain or branched-chain alkanediyl group having between 1 and 6 carbon atoms;
(iii) an ethoxylated alcohol surfactant;
(iv) a $C_1$-$C_3$ alkyl lactate;
(v) one or more compounds of the formula $C_7$-$C_9$alkylC(O)OMe;
(vi) ethanol;
(vii) a cellulose ether; and
(viii) silica.

The methyl esters of soybean oil fatty acids may be present in the composition in an amount between about 1% and about 45% by weight. The aliphatic diesters of dicarboxylic acids of the formula (I) may be present in the composition in an amount between about 30% and about 85% by weight. The ethoxylated alcohol surfactant may be present in the composition in an amount between about 5% and about 20% by weight. The $C_1$-$C_3$ alkyl lactate may be present in the composition in an amount between about 1% and about 45% by weight. The one or more compounds of the formula $C_7$-$C_9$alkylC(O)OMe may be present in the composition in an amount between about 0.5% and about 10% by weight, or in an amount between about 0.5% and about 3% by weight. The ethanol may be present in the composition in an amount between about 1% and about 5% by weight. The silica may be present in the composition in an amount between about 1% and about 2% by weight and the cellulose ether may be present in the composition in an amount between about 0.05% and about 2% by weight.

The compositions may be prepared by mixing the alkyl esters of one or more soybean oil fatty acids, the one or more aliphatic diesters of dicarboxylic acids, the one or more compounds of the formula $R_2C(O)OR_3$, the surfactant, and any other components (such as for example an alkyl lactate and/or a $C_1$-$C_{10}$ alcohol) until a homogeneous mixture is obtained. If it is desired to prepare a gel, an appropriate thickener may be added to the homogenous mixture. Typically, the thickener is added slowly and mixing of the resultant mixture is performed using a high shear mixer until the required consistency is obtained.

In another aspect the present invention provides a method for removing graffiti from a surface comprising: applying the composition of the first aspect to the graffiti, and rinsing the surface to remove the composition and graffiti.

The compositions may be applied to wet or dry surfaces. Preferably however, the compositions are applied to dry surfaces. The compositions may be applied to the graffiti by methods well known to those skilled in the art, for example by use of a paint sprayer, a brush or a soft broom. The period of time necessary to allow the composition to penetrate the graffiti (dwell time) prior to rinsing will vary depending on the nature of the composition, the type of graffiti and the surface to which the composition is applied. In most situations the dwell time required will be between about 1 minute and about 10 minutes. The dwell time is likely to be longer when the surface is a porous surface. In some embodiments the method further comprises agitating the surface to which the composition has been applied so as to facilitate penetration of the composition into the graffiti. Where agitation is employed the dwell time is likely to be reduced. Agitation may be performed using, for example, a nylon brush. Agitation may be useful where the surface is a porous surface. Compositions comprising silica have been found to be unexpectedly efficacious when used together with agitation on porous surfaces. Rinsing the surface to remove the composition and graffiti may be performed by water rinsing using, for example, a pressure washer or low pressure garden water spray pump or hose. Alternatively, rinsing may be performed with a wet rag.

In another aspect the present invention provides a method for removing graffiti from a graffitied surface comprising:
(i) applying the composition of the first aspect to the graffitied surface;
(ii) applying urea, or a salt thereof, to the graffitied surface;
(iii) rinsing the graffitied surface to remove the composition of the first aspect, and/or the urea or a salt thereof, and the graffiti;

The method may further comprise agitating the graffitied surface to which the composition of the first aspect, and/or the urea, or a salt thereof, has been applied.

The use of urea, or a salt thereof, has been found to be highly effective in removing graffiti residue that may, on rare occasions, remain after use of the composition of the first aspect.

Examples of suitable urea salts include acid addition salts, for example urea hydrochloride, urea hydrobromide, urea hydroiodide and the like. Other acid addition salts of urea will be well known to those skilled in the art. The urea, or salt thereof, may be applied in water, for example as a solution. The concentration of the urea, or salt thereof in the solution may be between about 30% and 80% by weight, or between about 40% and 80% by weight, or between about 40% and 60% by weight. The solution may further comprise about 5% to 30% by weight chloride, or about 10% to 15% by weight chloride.

Steps (i) and (ii) may be performed as described above, for example by use of a paint sprayer, a brush or a soft broom. Typically, step (i) is performed before step (ii), however in some embodiments step (ii) may be performed before step (i). Agitation may also be performed as described above, for example by use of a nylon brush. Agitation may be useful where the surface is a porous surface. In some embodiments agitation of the surface may be performed after application of the composition of the first aspect and also after application of the urea, or a salt thereof. The dwell time following steps (i) and (ii) may be between about 1 minute and about 5 minutes, or about 3 minutes. Step (iii) may be performed as described above, for example by water rinsing using a pressure washer or low pressure garden water spray pump or hose. Alternatively, rinsing may be performed with a wet rag. Rinsing may be performed once during the method or more than once, for example twice or three times. Preferably, rinsing is performed once or twice.

In an embodiment of the third aspect the invention provides a method for removing graffiti from a graffitied surface comprising:
(i) applying the composition of the first aspect to the graffitied surface,
(ii) agitating the graffitied surface to which the composition has been applied,
(iii) applying urea, or a salt thereof, to the graffitied surface to which the composition has been applied,
(iv) agitating the graffitied surface to which the urea, or salt thereof, has been applied, and
(v) rinsing the graffitied surface to remove the composition, the urea or salt thereof, and the graffiti.

In another embodiment of the third aspect the invention provides a method for removing graffiti from a graffitied surface comprising:
(i) applying the composition of the first aspect to the graffitied surface, (ii) rinsing the graffitied surface to remove the composition and graffiti, (iii) applying urea, or a salt thereof, to the graffitied surface to which the composition was applied,
(iv) agitating the graffitied surface to which the urea, or salt thereof, has been applied,
(v) rinsing the graffitied surface to remove the urea, or salt thereof.

Examples

The invention will now be described in more detail, by way of illustration only, with respect to the following examples. The examples are intended to serve to illustrate this invention and should not be construed as limiting the generality of the disclosure of the description throughout this specification.

Compositions of the invention may be prepared according to the following standard procedure:
1. Ensure mixing vessel is clean and dry and free from water and other solvents.
2. Add formulation quantity of one or more aliphatic diesters of dicarboxylic acids.
3. Add formulation quantity of alkyl esters of one or more soybean oil fatty acids.
4. Add formulation quantity of one or more compounds of the formula $R_2C(O)OR_3$.
5. Add formulation quantities of alkyl lactate and/or a $C_1$-$C_{10}$ alcohol if desired.
6. Add formulation quantity of surfactant.
7. Mix until a homogeneous mixture is obtained.
8. If a gel consistency is required, add formulation quantity of a thickener in small amounts at a time while blending using a high shear mixture until the required consistency is obtained.
9. If desired, add formulation quantity of silica, for example silica #100G.

The following compositions may be prepared in accordance with the invention. All percentages are w/w.

| Composition 1 | |
|---|---|
| Blend of methyl octanoate and methyl decanoate | 3% |
| Blend of methyl lactate and methyl ester soybean oil | 22% |
| Blend of dimethyl adipate and dimethyl succinate | 65% |
| $C_{12}$-$C_{14}$ ethoxylated alcohol | 10% |

| Composition 2 | |
|---|---|
| Blend of ethyl octanoate and methyl nonanoate | 2% |
| Blend of ethyl lactate and methyl ester soybean oil | 28% |
| Blend of dimethyl adipate, dimethyl glutarate and dimethyl succinate | 60% |
| $C_{12}$-$C_{14}$ ethoxylated alcohol | 10% |

| Composition 3 | |
|---|---|
| Blend of propyl nonanoate and ethyl decanoate | 2% |
| Blend of ethyl lactate and methyl ester soybean oil | 7.7% |
| Blend of dimethyl adipate, dimethyl glutarate and dimethyl succinate | 74.5% |
| $C_{12}$-$C_{14}$ ethoxylated alcohol | 9.7% |
| Ethanol | 3.1% |
| Hydroxypropylmethylcellulose | 1.5% |
| Silica | 1.5% |

Composition 4

| | |
|---|---|
| Blend of methyl octanoate and methyl decanoate | 1.5% |
| Blend of ethyl lactate and methyl ester soybean oil | 8.5% |
| Blend of dimethyl adipate, dimethyl glutarate and dimethyl succinate | 76.3% |
| $C_{12}$-$C_{14}$ ethoxylated alcohol | 9.9% |
| Ethanol | 3.3% |
| Hydroxypropylmethylcellulose | 0.5% |

Composition 5

| | |
|---|---|
| Blend of methyl octanoate and methyl decanoate | 1.5% |
| Blend of methyl lactate and methyl ester soybean oil | 23.5% |
| Blend of dimethyl adipate and dimethyl succinate | 65% |
| $C_{12}$-$C_{14}$ ethoxylated alcohol | 10% |

Composition 6

| | |
|---|---|
| Blend of methyl octanoate and ethyl decanoate | 1.5% |
| Blend of ethyl lactate and methyl ester soybean oil | 18.5% |
| Blend of dimethyl glutarate and dimethyl succinate | 66.5% |
| $C_{12}$-$C_{14}$ ethoxylated alcohol | 9.5% |
| Methanol | 3.5% |
| Methylcellulose | 0.5% |

Composition 7

| | |
|---|---|
| Blend of ethyl nonanoate and methyl decanoate | 2% |
| Blend of methyl lactate and methyl ester soybean oil | 15% |
| Blend of dimethyl adipate and dimethyl succinate | 70% |
| $C_{12}$-$C_{14}$ ethoxylated alcohol | 7.5% |
| Methanol | 3% |
| methylcellulose | 1% |
| Silica | 1.5% |

Composition 8

| | |
|---|---|
| Blend of methyl octanoate and methyl decanoate | 1.5% |
| Blend of ethyl lactate and methyl ester soybean oil | 23.5% |
| Dimethyl adipate | 65% |
| $C_{12}$-$C_{14}$ ethoxylated alcohol | 10% |

Composition 9

| | |
|---|---|
| Dispersa O-250 | 2% |
| STEPOSOL ® SC | 28% |
| Rhodiasolv ® RPDE | 60% |
| $C_{12}$-$C_{14}$ ethoxylated alcohol | 10% |

Composition 10

| | |
|---|---|
| Dispersa O-250 | 1.5% |
| STEPOSOL ® SC | 8.5% |
| Rhodiasolv ® RPDE | 76.3% |
| $C_{12}$-$C_{14}$ ethoxylated alcohol | 9.9% |
| Ethanol | 3.3% |
| Hydroxypropylmethylcellulose | 0.5% |

Composition 11

| | |
|---|---|
| Dispersa O-250 | 2% |
| STEPOSOL ® SC | 7.7% |
| Rhodiasolv ® RPDE | 74.5% |
| $C_{12}$-$C_{14}$ ethoxylated alcohol | 9.7% |
| Ethanol | 3.1% |
| Hydroxypropylmethylcellulose | 1.5% |
| Silica | 1.5% |

Composition 12

| | |
|---|---|
| Dispersa O-250 | 3% |
| STEPOSOL ® ME | 31% |
| Rhodiasolv ® IRIS | 56% |
| $C_{12}$-$C_{14}$ ethoxylated alcohol | 10% |

Composition 13

| | |
|---|---|
| Dispersa O-250 | 2% |
| STEPOSOL ® SB-D | 10% |
| Rhodiasolv ® DIB | 74.3% |
| $C_{12}$-$C_{14}$ ethoxylated alcohol | 10% |
| Ethanol | 3.2% |
| Hydroxyethylcellulose | 0.5% |

Composition 14

| | |
|---|---|
| Dispersa O-250 | 2% |
| STEPOSOL ® SB-W | 14.3% |
| Flexisolv ® DBE-2 | 70% |
| $C_{12}$-$C_{14}$ ethoxylated alcohol | 9.9% |
| Ethanol | 3.3% |
| Hydroxypropylmethylcellulose | 0.5% |

Use of Compositions to Remove Graffiti from a Surface

A porous substrate of brick and concrete panels was tagged with coloured spray paints and allowed to dry for 2 weeks. The affected surface area was treated with composition 7. Following application the surface was agitated and after a dwell time of 3 minutes rinsed with water using a pressure washer. The results indicate that all paint was removed and no residue remained.

A porous substrate of brick and concrete panels was tagged with coloured spray paints and allowed to dry for 2 weeks. The affected surface area was treated with composition 7. Following application the surface was agitated and then a blend of water and urea hydrochloride was applied. Agitation was then performed again. After a dwell time of 1 to 3 minutes the surface was rinsed with water using a pressure washer.

A porous substrate of brick and concrete panels was tagged with coloured spray paints and allowed to dry for 2 weeks. The affected surface area was treated with composition 7. After a dwell time of 1 to 3 minutes the surface was rinsed using a wet rag. A blend of water and urea hydrochloride was then applied. Agitation of the surface was performed followed by rinsing with a high pressure washer.

The reference in this specification to any prior publication (or information derived from it), or to any matter which is known, is not, and should not be taken as an acknowledgement or admission or any form of suggestion that that prior publication (or information derived from it) or known matter forms part of the common general knowledge in the field of endeavor to which this specification relates.

It will be appreciated by those skilled in the art that numerous variations and/or modifications may be made to the invention without departing from the spirit or scope of the invention as broadly described. The present embodiments are therefore to be considered in all respects as illustrative and not restrictive.

The invention claimed is:

1. A method for removing graffiti from a surface consisting of:
   applying a composition to a surface, the composition consisting of (i) alkyl esters of one or more soybean oil fatty acids, (ii) one or more aliphatic diesters of dicarboxylic acids, (iii) one or more compounds of the formula $R_2C(O)OR_3$, wherein $R_2$ is $C_1$-$C_{20}$ alkyl and $R_3$ is $C_1$-$C_{10}$ alkyl; (iv) a surfactant, and optionally (v) ethanol to the graffiti;
   optionally, agitating the surface to which the composition has been applied; and
   rinsing the surface to remove the composition and the graffiti.

2. A method for removing graffiti from a graffitied surface consisting of:
   applying a composition to a graffitied surface, the composition consisting of (i) alkyl esters of one or more soybean oil fatty acids, (ii) one or more aliphatic diesters of dicarboxylic acids, (iii) one or more compounds of the formula $R_2C(O)OR_3$, wherein $R_2$ is $C_1$-$C_{20}$ alkyl and $R_3$ is $C_1$-$C_{10}$ alkyl; (iv) a surfactant, and optionally (v) ethanol to the graffitied surface;
   applying urea, or a salt thereof, to the graffitied surface;
   optionally, agitating the graffitied surface to which the composition and the urea, or a salt thereof, has been applied; and
   rinsing the graffitied surface to remove the composition, the urea or a salt thereof, and the graffiti.

3. The method of claim 2, wherein the urea, or salt thereof, is applied as a solution in water.

4. A method for removing graffiti from a surface consisting of:
   applying a composition to a surface, said composition consisting of (i) alkyl esters of one or more soybean oil fatty acids, (ii) one or more aliphatic diesters of dicarboxylic acids, (iii) one or more compounds of the formula $R_2C(O)OR_3$, wherein $R_2$ is $C_3$-$C_{15}$ alkyl and $R_3$ is methyl; (iv) a surfactant, and (v) a $C_1$-$C_{10}$ alcohol to the graffiti;
   optionally, agitating the surface to which the composition has been applied;
   optionally, applying urea, or a salt thereof, to the graffitied surface; and
   rinsing the surface to remove the composition and the graffiti.

5. The method of claim 4, wherein the urea, or salt thereof, is applied as a solution in water.

* * * * *